United States Patent [19]

Uozumi et al.

[11] Patent Number: 5,223,713

[45] Date of Patent: Jun. 29, 1993

[54] SCANNER FOR SCANNING TUNNELING MICROSCOPE

[75] Inventors: Kiyohiko Uozumi, Tokyo; Keiichi Nakamoto, Kanagawa, both of Japan

[73] Assignee: JEOL Ltd., Tokyo, Japan

[21] Appl. No.: 815,382

[22] Filed: Dec. 31, 1991

[30] Foreign Application Priority Data

Jan. 11, 1991 [JP] Japan .................. 3-013850

[51] Int. Cl.$^5$ .............................................. H01J 37/00
[52] U.S. Cl. .................. 250/306; 250/442.11
[58] Field of Search ............ 250/306, 307, 442.11

[56] References Cited

U.S. PATENT DOCUMENTS

| | | |
|---|---|---|
| 4,343,993 | 8/1992 | Binnig et al. |
| 4,686,440 | 8/1987 | Hatamura et al. ............. 250/442.11 |
| 4,798,989 | 1/1989 | Miyazaki et al. ................... 250/306 |
| 4,906,840 | 3/1990 | Zdeblick et al. .................... 250/307 |
| 4,912,822 | 4/1990 | Zdeblick et al. .................... 250/306 |
| 5,051,594 | 9/1991 | Tsuda et al. .................... 250/442.11 |
| 5,103,094 | 4/1992 | Hayes et al. ......................... 250/306 |

OTHER PUBLICATIONS

"Surface Studies by Scanning Tunneling Microscopy", G. Binnig et al., Physical Review Letters, The American Physical Society, vol. 49, No. 1 (1982), pp. 57-61.
"Single-tube Three-dimensional scanner for scanning tunneling microscopy", G. Binnig et al., Rev. Sci. Instrum., American Institute of Physics, 57(8), (1986), pp. 1688-1689.
"Novel Three-Dimensional Positioner and Scanner for the STM Using Shear Deformation of Piezoceramic Plates", K. Uozumi et al., Japanese Journal of Applied Physics, vol. 27, No. 1, Jan. (1988), pp. L123-L126.

Primary Examiner—Bruce C. Anderson
Attorney, Agent, or Firm—Webb, Burden, Ziesenheim & Webb

[57] ABSTRACT

A three-dimensional scanner for moving the probe tip of a scanning tunneling microscope. The scanner has a table equipped with a three-dimensional coarse displacement mechanism. Two xy piezoelectric transducers are so mounted that they can expand in the xy plane perpendicular to the z-axis along which the probe tip extends. The xy transducers are mounted to the table at their rear ends such that they almost intersect each other at right angles at their front ends. A support member is mounted to the almost intersecting front ends of the xy piezoelectric transducers. A z piezoelectric transducer is attached to the support member. This z transducer produces shear deformations in the z-direction. Electrodes are attached to both faces of each of all these piezoelectric transducers. Appropriate voltages are applied to the electrodes to move the probe tip over quite short distances in three dimensions.

4 Claims, 2 Drawing Sheets

SCANNER FOR SCANNING TUNNELING MICROSCOPE

FIELD OF THE INVENTION

The present invention relates to a small-sized scanner which is incorporated in a scanning tunneling microscope (STM), capable of causing the probe tip of the STM to scan a wide surface area, and is able to produce STM images involving quite small distortions.

BACKGROUND OF THE INVENTION

When a voltage is applied between a fine tip and a sample after the tip has been brought to within a few tens of a nanometer of the surface of the sample, a tunnel current flows. This tunnel current varies greatly, depending on the spacing between the tip and the sample, or the height of the tip above the sample. The distance between the sample and the tip can be quite accurately measured by measuring the amplitude of the tunnel current. A scanning tunneling microscope (STM) images the topography of the surface of a sample accurately, utilizing this phenomenon. For this imaging, the sample surface is scanned in two dimensions by the STM probe tip. During the scan, the distance between the tip and the sample, or the height of the tip above the sample, is controlled so that the tunnel current may be maintained constant. A signal which is used for this control is also employed to image the topography of the sample surface. This scanning tunneling microscope of this structure has attracted attention to analyze the arrangement of atoms at the sample surface. Also, the scanning tunneling microscope has rapidly spread to various applications in these years, because it is simple in structure and small in size. For example, the instrument is applied to measurement of surface roughness of semiconductor devices. This kind of scanning tunneling microscope is disclosed, for example, in U.S. Pat. No. 4,343,993.

Three-dimensional mechanical scanners of this construction used in scanning tunneling microscopes are classified into three major types. One type is shown in FIG. 5 and comprises three piezoelectric transducers 1X, 1Y, and 1Z which are designed to expand. These transducers are so assembled that they extend perpendicular to each other. This type of scanner is disclosed in the *Physical Review Letters*, Vol. 49, No. 1, 1982, published by the American Physical Society. Electrodes $2X_1$, $2X_2$, ($2X_2$ is not shown), $2Y_1$, $2Y_2$, ($2Y_2$ is not shown), and $2Z_1$, $2Z_2$ ($2Z_2$ is not shown) are attached to the piezoelectric transducers 1X, 1Y, 1Z, respectively. Appropriate voltages are applied between the electrodes to move a probe tip 3 quite short distances in three dimensions. This type of scanner needs a large space, since the three piezoelectric transducers must be assembled so as to extend in mutually orthogonal directions as shown. Also, the piezoelectric transducer for scan in the x-direction interferes with the piezoelectric transducer for scan in the y-direction, because the three transducers are mounted so as to extend perpendicular to each other. As a result, the obtained STM image is distorted.

Another type of scanner is shown in FIG. 6, where an electrode 4Z for scan in the z-direction, electrodes $4X_1$, $4X_2$ ($4X_2$ is not shown) for scan in the x-direction, electrodes $4Y_1$, $4Y_2$ ($4Y_2$ is not shown) for scan in the y-direction are mounted to the outer surface of a piezoelectric transducer 4 which expands and consists of a hollow cylinder. A common electrode 4G is mounted on the inner surface of the transducer 4. This type is disclosed in *Rev. Sci. Instrum.*, 57(8), August 1986, published by the American Institute of Physics. Appropriate voltages are applied between the common electrode and the other electrodes to move a probe tip 5 in three dimensions over quite minute distances. If a long piezoelectric transducer is used as the transducer 4 to extend the ranges of x and y scans, a distortion occurs at the ends in the z-direction. The amount of distortion produced is in proportion to the length of the piezoelectric transducer. As an example, if the transducer if 20 mm long, and if the probe tip is scanned over a distance of 2 µm, then a distortion of about 400Å is produced.

A third type is shown in FIG. 7 and comprises piezoelectric transducers 6X, 6Y, 6Z stacked on top of each other. The transducers 6X and 6Y cause shear deformations. The transducer 6Z causes an elongation as viewed from a probe tip 7. This type is disclosed in the *Japanese Journal of Applied Physics*, Vol. 27, No. 1, January 1988. Electrodes are attached to both faces of each piezoelectric transducer. Suitable voltages are applied to these electrodes to move the probe tip 7 over very short distances in three dimensions. In order to extend the ranges of x and y scans, it is necessary that numerous piezoelectric transducers be stacked. This complicates the wiring between the piezoelectric transducers and increases the cost.

SUMMARY OF THE INVENTION

It is an object of the present invention to provide a small-sized scanner which is incorporated in a scanning tunneling microscope and can cause the probe tip to scan a wide area while suppressing the produced distortion.

The above object is achieved by an STM probe tip scanner comprising: a table; two xy piezoelectric transducers mounted so as to be capable of expanding within the xy plane perpendicular to the z-axis along which the probe tip extends, each xy transducer taking the form of a flat and rectangular plate or sheet, the xy transducers being mounted to the table at their rear ends in such a way that the xy transducers almost intersect each other at right angles at their front ends; a support member mounted to the almost intersecting front ends of the xy piezoelectric transducers; and a z piezoelectric transducer to which the probe tip is mounted and which moves a quite short distance in the z-direction, the z transducer being mounted to the support member.

DESCRIPTION OF THE PREFERRED EMBODIMENTS

Figure 1:
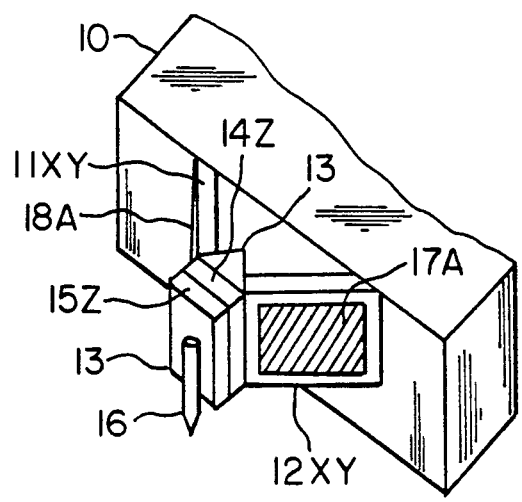
FIG. 1 is a schematic perspective view of a scanner for an STM probe tip, the scanner being built in accordance with the present invention.
Figure 2:
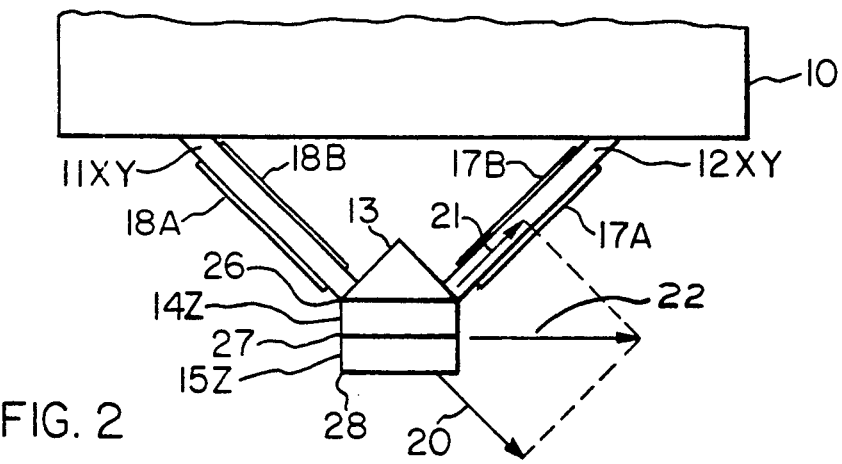
FIG. 2 is a cross-sectional view of the scanner shown in FIG. 1, as viewed from the tip.
Figure 3:
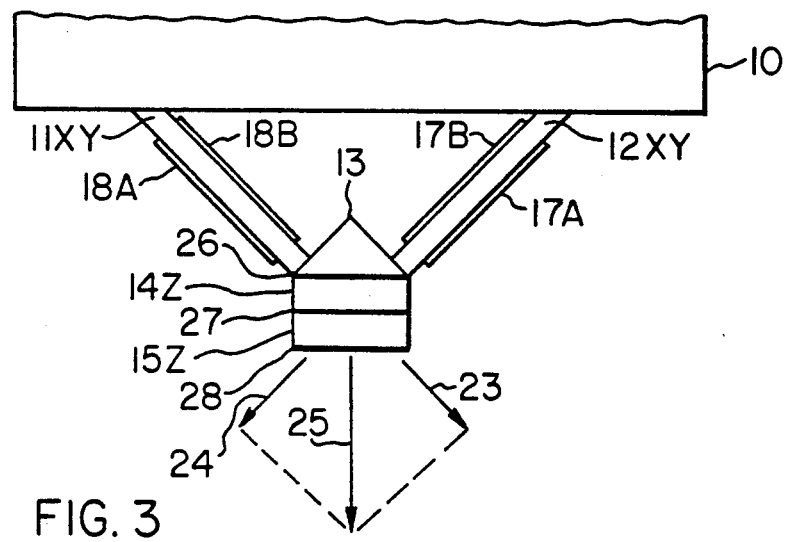
FIG. 3 is a view similar to FIG. 2, but showing another mode of operation.

Referring to FIGS. 1-3, there is shown a scanner embodying the concept of the present invention, the scanner acting to move an STM (scanning tunneling microscope) probe tip over quite short distances. The scanner comprises a table 10, piezoelectric transducers 11XY, 12XY capable of elongation, a support member 13, piezoelectric transducers 14Z, 15Z producing shear deformations. The probe tip is indicated by numeral 16.

The table 10 is provided with a three-dimensional coarse shift mechanism (not shown). The elongation piezoelectric transducers 11XY and 12XY are each made of a rectangular sheet, and they almost intersect each other at right angles at their front ends. 12XY is mounted to the table 10. A support member 13 is attached to the other end of each of them. Electrodes 17A and 17B are attached to both faces of the piezoelectric transducer 12XY. Similarly, electrodes 18A and 18B are fixed to both faces of the piezoelectric transducer 11XY. The shear piezoelectric transducers 14Z and 15Z are stacked on each other and mounted on the support member 13. Electrodes 26 and 28 are mounted to one face of the shear piezoelectric transducers 14Z and 15Z, respectively. Electrode 27 is mounted between the shear piezoelectric transducer 14Z and the shear piezoelectric transducer 15Z. The probe tip 16 is mounted to this transducer 15Z.

Referring to FIG. 2, when $-U$ and $+U$ volts are applied to the electrodes 18A and 18B, respectively, on the elongation piezoelectric transducer 11XY, this transducer 11XY contracts in the direction of the width. Thus, the transducer 11XY elongates in a direction, indicated by the arrow 20, perpendicular to the direction of the width. The degree of the elongation corresponds to the absolute value U of the applied voltages $+U$ and $-U$. When $-U$ and $+U$ volts are applied to the electrodes 17A and 17B, respectively, on the elongation piezoelectric transducer 12XY, it contracts in the direction of the width and, therefore, it elongates in a direction, indicated by the arrow 21, perpendicular to the direction of the width. As a result, the support member 13 moves in the x-direction indicated by the arrow 22, which is the direction of the resultant of the two elongations. The amount of this movement corresponds to the absolute value U of the applied voltages $+U$ and $-U$ volts.

Referring to FIG. 3, when $-V$ and $+V$ volts are applied to the electrodes 18A and 18B, respectively, on the elongation piezoelectric transducer 11XY, it contracts in the direction of the width and so it elongates in a direction, indicated by the arrow 23, perpendicular to the direction of the width. The degree of the elongation corresponds to the absolute value V of the applied voltages $+V$ and $-V$ volts. When $+V$ and $-V$ volts are applied to the electrodes 17A and 17B, respectively, on the elongation piezoelectric transducer 12XY, it contracts in the direction of the width, so that it elongates in a direction, indicated by the arrow 24, which is perpendicular to the direction of the width. The result is that the support member 13 moves in the y-direction, indicated by the arrow 25, which is the direction of the resultant of the two elongations. The amount of this movement corresponds to the absolute value V of the applied voltages $+V$ and $-V$ volts. Therefore, in order to scan the probe tip 16 in the x- and y-directions, $(-U -V)$ and $(+U +V)$ volts are applied to the electrodes 18A and 18B, respectively, on the elongation piezoelectric transducer 11XY. At the same time, $(-U +V)$ and $(+U -V)$ volts are applied to the electrodes 17A and 17B, respectively, on the elongation piezoelectric transducer 11XY. Also, the scanner is so designed that $+W$, $-W$, and $+W$ volts can be applied to the electrodes 26, 27, 28, respectively, on the shear piezoelectric transducers 14Z and 15Z. When $+W$ and $-W$ volts are applied to the electrodes 26 and 27, respectively, to activate only the shear piezoelectric transducer 14Z, the probe tip 16 moves in the z-direction. When $-W$ and $+W$ volts are applied to the electrodes 27 and 28, respectively, to activate only the shear piezoelectric transducer 15Z, the probe tip 16 moves in the reverse direction to the z-direction.

The piezoelectric transducers 11XY and 12XY which expand and contract in the x- and y-directions produce displacements given by $Q \cdot (l/d) \cdot D$, where Q is the piezoelectric constant, d is the thickness of each piezoelectric transducer, l is the length of each piezoelectric transducer in the displacement direction, and D is the voltage applied to the electrodes on each piezoelectric transducer. Thus, a larger displacement can be obtained as the value of (l/d) increases. In the above embodiment, a long sheet is used as each of the piezoelectric transducers 11XY and 12XY and, therefore, quite large displacements can be obtained. For example, where $Q = 3.0$ Å/V, $l = 20$ mm, $d = 0.5$ mm, and $D = \pm 150$ V, a displacement as large as 3.6 μm can be derived.

Figure 4:
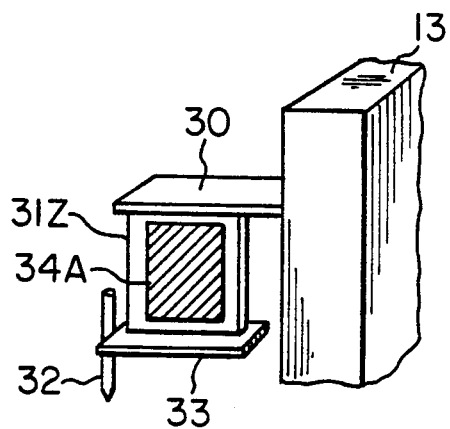
FIG. 4 is a schematic perspective view of another scanner for an STM probe tip, the scanner being built in accordance with the invention.
Figure 5:
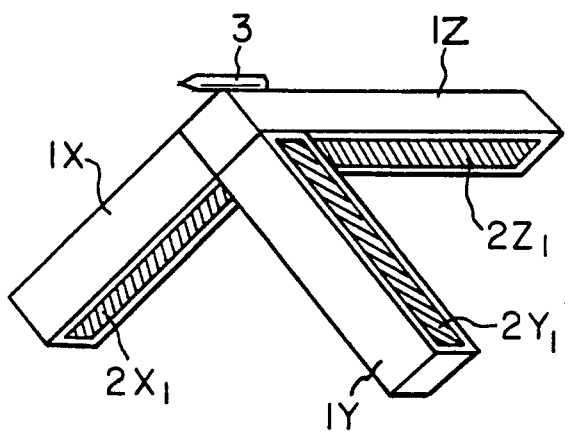
FIG. 5 is a schematic perspective view of a conventional scanner for an STM probe tip.
Figure 6:
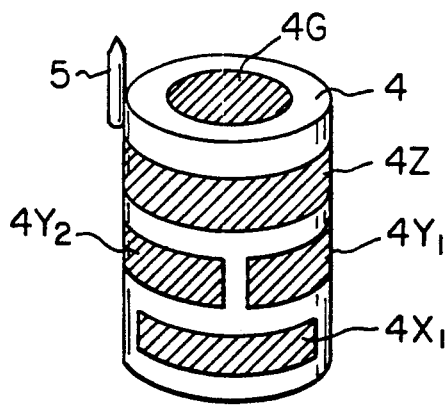
FIG. 6 is a schematic perspective view of another conventional scanner for an STM probe tip.
Figure 7:
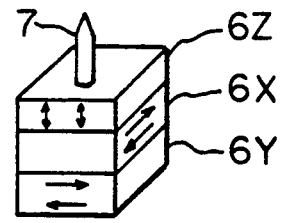
FIG. 7 is a schematic perspective view of a further conventional scanner for an STM probe tip.

In the above embodiment, piezoelectric transducers producing shear deformations are used as the piezoelectric transducers causing displacements in the z-direction. Piezoelectric transducers which elongate can also be used to drive the probe tip in the z-direction. Specifically, as shown in FIG. 4, a first support plate 30 is mounted to the support member 13. An elongation piezoelectric transducer 31Z, for example, in the form of a plate or sheet, is mounted to the support plate 30. A second support plate 33 to which a probe tip 32 is mounted is attached to one end of the piezoelectric transducer 31Z. Positive and negative voltages of an appropriate amplitude are applied to electrodes 34A and 34B (34B is not shown) mounted on both faces of the elongation piezoelectric transducer 31Z to displace it in the z-direction.

In the novel scanner for an STM probe tip, two xy piezoelectric transducers which are used for scans in the x- and y-directions and each of which takes the form of a sheet are mounted at their rear ends to a table in such a manner that the transducers almost intersect each other at right angles at their front ends. A support member is mounted to these almost intersecting front ends. A z piezoelectric transducer for displacement in the z-direction is mounted to the support member, the probe tip being attached to the z transducer. Because of this structure, the scanner does not need large space but is able to scan a wide area. In addition, the z piezoelectric transducer does not interfere with the xy piezoelectric transducers, because the z transducer is not fixed to the table to which the xy transducers are secured. Hence, the resulting STM image is not distorted. Moreover, no distortion takes place at the ends in the z-direction, because long piezoelectric transducers are not required. Another advantage is that large space is not necessitated, insomuch as numerous piezoelectric transducers are not required to be stacked on top of each other. Also, this is economically advantageous. In consequence, the present invention offers a small-sized scanner which is used to move an STM probe tip over quite short distances and which can scan a wide area and produce an STM image having only a little distortion.

Having thus described our invention with the detail and particularity required by the Patent Laws, what is claimed and desired to be protected by Letters Patent is set forth in the following claims.

What is claimed is:

1. A scanner for moving the probe tip of a scanning tunneling microscope, comprising:
    a table;
    two xy piezoelectric transducers mounted so as to be capable of expanding within the xy plane perpendicular to the z-axis along which the probe tip extends, each xy transducer taking the form of a flat and rectangular plate or sheet perpendicular to the xy plane, the xy transducers being mounted to the table at their rear ends in such a way that the xy transducers almost intersect each other at right angles at their front ends;
    a support member mounted to the almost intersecting front ends of the xy piezoelectric transducers; and
    a z piezoelectric transducer to which the probe tip is mounted and which moves a quite short distance in the z-direction, the z transducer being mounted to the support member.

2. The scanner of claim 1, wherein said z piezoelectric transducer produces shear deformations.

3. A scanner for moving the probe tip of a scanning tunneling microscope, comprising:
    a table;
    two xy piezoelectric transducers mounted so as to be capable of expanding within the xy plane perpendicular to the z-axis along which the probe tip extends, each xy transducer taking the form of a flat and rectangular plate or sheet perpendicular to the xy plane, the xy transducers being mounted to the table at their rear ends in such a way that the xy transducers almost intersect each other at right angles at their front ends;
    a support member mounted to the almost intersecting front ends of the xy piezoelectric transducers;
    a support plate mounted to the support member; and
    a z piezoelectric transducer to which the probe tip is mounted and which moves a quite short distance in the z-direction, the z transducer being mounted to the support plate.

4. A scanner for moving the probe tip which is positioned along a z-axis of a scanning tunneling microscope, comprising:
    a table;
    two xy piezoelectric transducers mounted so as to be capable of expanding within an xy plane perpendicular to said z-axis, each said xy transducer taking the form of a flat and rectangular plate which is perpendicular to said xy plane, each said xy transducer being mounted to said table at a rear end thereof such that said xy transducers almost intersect each other at right angles at their forward ends;
    a support member mounted to said almost intersecting front ends of said xy piezoelectric transducers; and
    an independent z piezoelectric transducer to which said probe tip is mounted and which moves a quite short distance in the z-direction independent of the movement of said two xy piezoelectric transducers, said z transducer being mounted to said support member, and producing shear deformation.

* * * * *

UNITED STATES PATENT AND TRADEMARK OFFICE
CERTIFICATE OF CORRECTION

PATENT NO. : 5,223,713

DATED : June 29, 1993

INVENTOR(S) : Kiyohiko Uozumi and Keiichi Nakamoto

It is certified that error appears in the above-identified patent and that said Letters Patent is hereby corrected as shown below:

Title page, [56] under References Cited, U.S. PATENT DOCUMENTS, "4,343,993 8/1992 Binnig et al." should read --4,343,993 8/1982 Binnig et al.--.

Column 2 Line 12 "if" (second occurrence) should read --is--. (first occurrence.)

Column 2 Line 14 "400Åis" should read --400 Å is--.

Column 3 Line 16 after "ends." insert --One end of each of the elongation transducers 11XY and--.

Signed and Sealed this

First Day of March, 1994

Attest:

BRUCE LEHMAN

*Attesting Officer*  *Commissioner of Patents and Trademarks*